United States Patent
Isselhorst et al.

(10) Patent No.: US 12,535,061 B2
(45) Date of Patent: Jan. 27, 2026

(54) PUMP ARRANGEMENT FOR PROVIDING A SATURATED LIQUID

(71) Applicants: Airbus Operations GmbH, Hamburg (DE); Airbus S.A.S., Blagnac (FR)

(72) Inventors: Armin Isselhorst, Blagnac (FR); Kei Philipp Behruzi, Blagnac (FR); Peter Friese, Hamburg (DE)

(73) Assignees: Airbus Operations GmbH, Hamburg (DE); Airbus S.A.S., Blagnac (FR)

( * ) Notice: Subject to any disclaimer, the term of this patent is extended or adjusted under 35 U.S.C. 154(b) by 231 days.

(21) Appl. No.: 18/209,729

(22) Filed: Jun. 14, 2023

(65) Prior Publication Data

US 2023/0417230 A1    Dec. 28, 2023

(30) Foreign Application Priority Data

Jun. 27, 2022 (EP) .................................... 22181308

(51) Int. Cl.
| | |
|---|---|
| F04B 15/08 | (2006.01) |
| F02M 59/38 | (2006.01) |
| H01M 8/04007 | (2016.01) |

(52) U.S. Cl.
CPC ............. *F04B 15/08* (2013.01); *F02M 59/38* (2013.01); *H01M 8/04007* (2013.01); *F04B 2015/0822* (2013.01); *H01M 2250/20* (2013.01)

(58) Field of Classification Search
CPC .......... F17C 2221/012; F17C 2221/032; F17C 2221/035; F17C 2223/0161;
(Continued)

(56) References Cited

U.S. PATENT DOCUMENTS 8,117,852 B2 * 2/2012 Mak .......................... F17C 9/00
62/48.1
8,727,821 B2 * 5/2014 Kwon ................. H01M 8/0668
440/6
(Continued)

FOREIGN PATENT DOCUMENTS

DE    102016001343 A1    8/2016
DE    102018221323 A1    6/2020
(Continued)

OTHER PUBLICATIONS

Extended European Search for Application No. 22181308.2 dated Dec. 14, 2022. 6 pgs.

*Primary Examiner* — Filip Zec
(74) *Attorney, Agent, or Firm* — Lerner David LLP (57) ABSTRACT

A pump arrangement for providing a saturated or subcooled liquid includes a tank for saturated liquid, a heat exchanger for cooling the saturated liquid, a pump, an expansion valve, and an output for feeding saturated or subcooled liquid to a consumer. A tank outlet is in fluid communication with a liquid inlet of the heat exchanger, such that saturated liquid stored inside the tank can flow into the heat exchanger designed to sub-cool the saturated liquid. A liquid outlet of the heat exchanger is in fluid communication with a pump inlet. The expansion valve outlet is in fluid communication with a coolant inlet of the heat exchanger. An expansion valve inlet is arranged for receiving and expanding a fraction of liquid flowing through the pump arrangement and routing it into the coolant input to at least partially evaporate and receive evaporation enthalpy of the liquid to be subcooled.

15 Claims, 5 Drawing Sheets

(58) Field of Classification Search
CPC ........ F17C 2223/0169; F17C 2223/033; F17C 2223/046; F17C 2225/0161; F17C 2225/0169; F17C 2225/035; F17C 2227/0107; F17C 2227/0114; F17C 2227/0135; F17C 2227/0142; F17C 2227/0339; F17C 2227/036; F17C 2227/0388; F17C 2250/043; F17C 2260/056; F17C 2265/066; F17C 2270/0184; F17C 2270/0189; F17C 9/00; F04B 15/08

See application file for complete search history.

(56) References Cited

U.S. PATENT DOCUMENTS

| | | | | |
|---|---|---|---|---|
| 9,239,186 | B2 * | 1/2016 | Jung | F25J 1/0097 |
| 10,337,439 | B2 * | 7/2019 | Seegmüller | F02D 41/221 |
| 10,518,859 | B2 * | 12/2019 | Lee | B63H 21/38 |
| 11,415,071 | B2 * | 8/2022 | Agnus | F02M 63/023 |
| 2015/0219280 | A1 * | 8/2015 | Braithwaite | F17C 3/00 62/48.3 |
| 2015/0316208 | A1 * | 11/2015 | Bae | F25J 1/0042 62/53.2 |
| 2016/0153366 | A1 * | 6/2016 | Steinert | F02M 63/005 123/457 |
| 2017/0059091 | A1 * | 3/2017 | Tafreshi | F25J 1/0022 |
| 2019/0226758 | A1 * | 7/2019 | Atapattu | F25J 1/0296 |
| 2020/0158288 | A1 * | 5/2020 | Li | F17C 7/04 |
| 2021/0332950 | A1 * | 10/2021 | Petitpas | F04B 53/145 |
| 2023/0015757 | A1 * | 1/2023 | Li | F17C 13/04 |
| 2024/0142057 | A1 * | 5/2024 | Sébastien | F04B 15/08 |
| 2024/0344529 | A1 * | 10/2024 | Honda | F04B 15/08 |

FOREIGN PATENT DOCUMENTS

| | | |
|---|---|---|
| FR | 3114355 A1 | 3/2022 |
| KR | 20220080774 A | 6/2022 |

* cited by examiner

PUMP ARRANGEMENT FOR PROVIDING A SATURATED LIQUID

TECHNICAL FIELD

The invention relates to a pump arrangement for providing a saturated or subcooled liquid, a method for providing a saturated liquid as well as a vehicle having at least one such pump arrangement.

BACKGROUND OF THE INVENTION

Feeding a saturated liquid from a tank to a consumer or another component through a pump, the pressure inside the tank decreases and cavitation in the pump becomes more probable. Such a saturated liquid may be liquid hydrogen, which may be stored in a storage tank inside an aircraft for feeding hydrogen to a consumer using a pump, or in a land transport vehicle for liquefied gases or marine transportation and feed systems or a stationary tank.

The challenges of pumping saturated liquids is known from aviation, marine and land vehicles and stationary applications. There are several approaches to increase the net positive suction pressure upstream a pump, which includes increasing pressure in the tank using vapor or other gases, heating vapor in the tank, changing a position of the pump to take benefit from hydrostatic pressure, using a pre-pump or subcooling the liquid at a pump inlet by low pressure evaporation and venting the gas over board, in particular in space applications. However, these solutions increase the complexity of the pump arrangement and may require particular effort in using a particular heater or evaporator, non-condensable gases to be carried along and be released/captured during refilling of the tank, instable stratification, and high additional weight and complexity or limiting the usability in space applications.

BRIEF SUMMARY OF THE INVENTION

An aspect of the invention proposes an alternative pump arrangement for pumping a saturated liquid, which allows an increase of net positive suction pressure of a pump with a high efficiency, a low weight and without the above-identified drawbacks.

A pump arrangement for providing a saturated liquid is proposed, comprising a tank for saturated liquid having a tank outlet, a heat exchanger for cooling the saturated liquid, the heat exchanger having a liquid inlet, a liquid outlet, a coolant inlet and a coolant outlet, a pump having a pump inlet and a pump outlet, an expansion valve having an expansion valve inlet and an expansion valve outlet, and a pump arrangement output downstream the pump outlet for feeding saturated liquid to a consumer, wherein the tank outlet is in fluid communication with the liquid inlet of the heat exchanger, such that saturated liquid stored inside the tank is able to flow into the heat exchanger, wherein the heat exchanger is designed to sub-cool the saturated liquid, wherein the liquid outlet of the heat exchanger is in fluid communication with the pump inlet, wherein the expansion valve outlet is in fluid communication with the coolant inlet of the heat exchanger, and wherein the expansion valve inlet is arranged downstream the liquid outlet of the heat exchanger or the tank for receiving and expanding a fraction of liquid flowing through the pump arrangement and routing it into the coolant input to at least partially evaporate and receive evaporation enthalpy of the liquid to be subcooled.

The pump arrangement according to an embodiment of the invention allows the increase of net positive suction pressure (NPSP) for a pump for a saturated liquid, wherein the disadvantages explained above are avoided. It is to be understood that the NPSP is the difference between the total pressure of the liquid to be pumped and the vapor pressure at a given temperature. The core features of the pump arrangement is explained in detail below.

The tank is a receptacle for receiving the saturated liquid. Depending on the liquid to be stored, the tank may be designed for mechanically withstanding a certain pressure. Furthermore, the tank may be thermally insulated for minimizing a heat transfer into the interior of the tank. For example, a saturated liquid may be liquid hydrogen, which is usually stored at cryogenic temperatures, wherein the tank is usually thermally insulated. However, tanks for liquefied petroleum gas (LPG), hydrocarbons and condensates may not necessarily be thermally insulated and the pump arrangement according to the invention is not limited to a certain liquid.

The tank may comprise a tank inlet that may be arranged at a top, a side or a bottom surface of the tank. It may be used for feeding saturated liquid into the tank. However, the tank inlet may also be used for feeding vapor or gas into the tank, as explained further below. The tank outlet may preferably be arranged at a bottom surface to further optimize the NPSP.

The heat exchanger is provided for subcooling the saturated liquid. For this, the saturated liquids can enter the heat exchanger through its liquid inlet and flow through one or a plurality of cooling channels created inside the heat exchanger. Afterwards, the subcooled liquid exits the heat exchanger at its liquid outlet. For providing the cooling function, a coolant inlet is provided, through which a two-phase flow of the saturated liquid is routed. Thus, the coolant function is provided by a part of the liquid in form of a two-phase flow. The two-phase flow is created by feeding a fraction of the saturated liquid that flows through the pump arrangement, into the expansion valve, such that it expands upstream of the coolant inlet. This leads to a partial evaporation at strongly reduced saturation temperature relative to the tank saturation temperature and the fluid reaching the coolant inlet is a mixture of liquid and vapor. Inside the heat exchanger the expanded liquid receives evaporation heat through the cooling channels, further evaporates and flows out through the coolant outlet. Resultantly, the liquid is subcooled and a flow of vapor is created. The expansion valve may be a throttle valve, which may be set to an expansion behavior through a fixed orifice geometry or similar, or which may be actively controlled. Also, the expansion valve may be a simple, switchable valve that is followed by one or more expansion nozzles.

As explained further below, the vapor may either be used for increasing the pressure inside the tank or it may be vented to the environment, depending on the embodiment of the pump arrangement according to the invention. By subcooling the saturated liquid, the NPSP at the pump inlet is increased and the pump may reliably pump the saturated liquid to a respective consumer. The risk of cavitation is decreased. The saturated or subcooled liquid is provided at the pump arrangement output, which is downstream the pump. In most embodiments described below, the pump arrangement output is directly connected to the pump outlet.

For the sake of completeness it is indicated that the expansion valve inlet may also be directly connected to the tank outlet.

In an advantageous embodiment, the pump arrangement further comprises a compressor coupled with the coolant outlet. The vapor created by vaporizing the saturated liquid enters the compressor and is pressurized. In some embodiments, the pressure of the vapor is increased above a tank pressure, such that the pressurized vapor, i.e. the pressurized gas, can be fed into the tank inlet to increase the tank pressure. In other embodiments, the vapor pressure is increased above the atmospheric pressure, such that the vapor can be vented to the atmosphere. The compressor allows to generate a lower pressure for evaporation in the heat exchanger for enabling a lower temperature on the coolant side.

In an advantageous embodiment, the expansion valve is connected to a fluid line downstream the pump and upstream the coolant inlet. Hence, a part of the saturated liquid flowing out of the pump outlet is tapped from a supply flow for a consumer of the saturated liquid and fed back into the expansion valve for being at least partially evaporated. This utilizes the pressure difference created by the pump and the feedback for the fraction of liquid into the expansion valve is simplified.

In an advantageous embodiment, the expansion valve is connected to a fluid line upstream the pump and upstream the coolant inlet. The expansion valve may be designed differently than an expansion valve fed with the saturated liquid tapped from a point downstream the pump. However, the pressure differential between the tank and the liquid outlet of the heat exchanger is sufficient for feeding the fraction of saturated liquid into the expansion valve. The overall efficiency of the pump arrangement may be slightly increased compared to the above-mentioned solution, as the fraction of the saturated liquid is not additionally pressurized before being expanded again.

In an advantageous embodiment, the compressor is connected to a tank inlet. The compressor generates the suction pressure to reduce the saturation pressure below the saturation pressure of the liquid within the tank and the vaporized liquid is fed into the tank inlet. Thus, the pressure inside the tank is increased, while no other gas from a separate gas source or a dedicated device are required for this purpose. The compressor is preferably designed to increase the pressure of the evaporated liquid to just slightly above the pressure inside the tank. The pressure difference can be made to depend on the respective saturated liquid and the required mass flow. The compressor as well as a pressure sensor downstream or inside the compressor may be connected to a control unit, which is able to control the compressor to provide a predetermined pressure increase.

In an advantageous embodiment, the compressor or coolant outlet is in fluid communication with the environment, i.e. the surrounding of the pump arrangement, which may be the atmosphere or the space that surrounds a vehicle, in which the pump arrangement is installed. The compressor may thus be capable of increasing the pressure of the vaporized liquid to a level above atmospheric pressure. A dedicated control of the compressor is not absolutely required as long as the pump arrangement is capable of always being able to vent the vaporized liquid into the atmosphere. This makes the pump arrangement capable of being operated under atmospheric pressure. If the coolant outlet is in fluid communication with the environment, the pump arrangement may be dedicated for space or high atmospheric altitude operation, e.g. in a cruise flight phase of a commercial aircraft at an altitude of about 10.000 m or more.

In an advantageous embodiment, the pump arrangement further comprises a jet pump having a primary inlet, a secondary inlet, and a jet pump outlet, wherein the expansion valve is arranged downstream of the liquid outlet of the heat exchanger, wherein the pump is coupled with the primary inlet, wherein the coolant outlet is coupled with the secondary inlet. The jet pump is fed with a pressurized flow of subcooled liquid as the primary flow. A secondary flow in the form of evaporated liquid is suctioned into the primary flow through the secondary inlet. Both flows mix and exit the jet pump outlet together.

In an advantageous embodiment, the jet pump outlet is coupled with a tank inlet. Consequently, the primary inlet of the jet pump is only provided with a part of a flow that exits the pump. It may provide a mixture of evaporated liquid and saturated liquid at the tank inlet to increase the pressure inside the tank.

In an advantageous embodiment, the pump arrangement output is downstream the pump and upstream the primary inlet of the jet pump. In line with the above, the main part of the flow exiting the pump outlet is fed to a consumer. Only a fraction is fed into the primary inlet of the jet pump.

In an advantageous embodiment, the pump arrangement output is connected to the jet pump outlet. As an alternative to the above, the jet pump outlet delivers the total mass flow for the consumer.

In an advantageous embodiment, the expansion valve has a variable cross-section for controlling the fraction of saturated liquid flowing through the expansion valve. As explained above, the expansion valve may then be controlled to provide a desired evaporation behavior and/or a required pressure drop.

In analogy to the above, the invention relates to a method for providing a saturated or subcooled liquid, comprising the steps of feeding the saturated liquid from a tank through a tank outlet to a liquid inlet of a heat exchanger to sub-cool the liquid, feeding a fraction of the sub-cooled liquid or the saturated or subcooled liquid from the tank to an expansion valve inlet of an expansion valve to evaporate it thereby at reduced temperature relative to the tank liquid temperature at least partially, and feed it to a coolant inlet of the heat exchanger for receiving evaporation enthalpy from the liquid flowing into the liquid inlet to substantially evaporate completely, feeding the sub-cooled liquid from a liquid outlet of the heat exchanger to a pump inlet of a pump, and pumping the sub-cooled liquid to a pump arrangement output downstream the pump outlet for feeding saturated liquid to a consumer.

In an advantageous embodiment, a compressor or a jet pump reduces the pressure of the coolant flow below the according tank saturation pressure.

In an advantageous embodiment, the method may further comprise the step of feeding the evaporated liquid into a tank inlet of the tank for increasing the pressure inside the tank.

In addition and in further analogy to the above, one, a plurality or all further steps may be provided. These may include compressing the evaporated liquid flowing out of the coolant outlet by means of a compressor. The compressed gas may be fed into the tank inlet or into the environment. The sub-cooled liquid may be fed to the expansion valve from downstream or upstream the pump.

Also, the sub-cooled liquid may be pumped into a primary inlet of a jet pump and the evaporated liquid flowing out of the coolant outlet may be fed into a secondary inlet of the jet pump, wherein a jet pump outlet supplies a pump arrangement output with sub-cooled liquid. In an alternative, the pump arrangement output is supplied with sub-cooled liquid from downstream the pump and upstream of the jet pump, wherein the primary inlet of the jet pump is provided with a fraction of sub-cooled liquid and wherein the secondary inlet of the jet pump is provided with the evaporated liquid flowing out from the coolant outlet, and wherein the jet pump delivers sub-cooled liquid and gas to the tank inlet.

If the compressor or the jet pump feed the coolant into the tank, the saturation pressure, i.e. the evaporation pressure, of the coolant is reduced below the saturation pressure of the liquid within the tank. This is particularly beneficial for operation of the pump arrangement at atmospheric pressures, which are above the saturation pressure of the coolant.

The method steps mentioned above are to be understood as defining a continuous process and the steps are conducted at the same time.

The invention further relates to a vehicle comprising at least one pump arrangement according to the above and at least one consumer coupled with the pump arrangement output of the at least one pump arrangement.

In an advantageous embodiment, the vehicle is an aircraft, wherein the at least one consumer comprises a fuel cell and/or a device for conducting a combustion.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION

Figure 1:
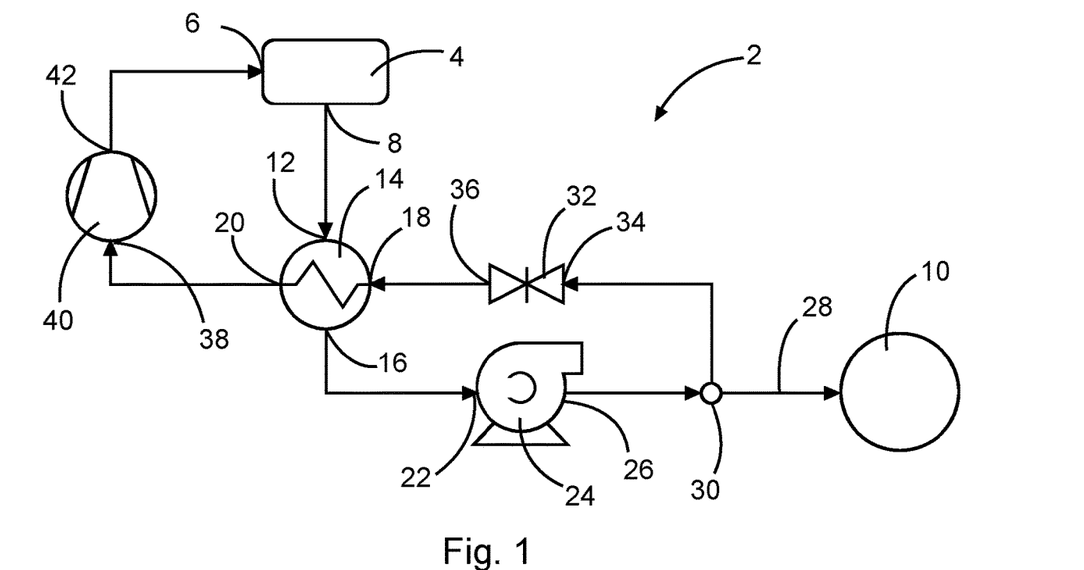
FIGS. 1 to 8 show different exemplary embodiments of a pump arrangement in schematic illustrations.

FIG. 1 shows a pump arrangement 2 in a first exemplary embodiment. Here, a tank 4 is provided, which stores a saturated liquid, such as liquid hydrogen, at saturation conditions. The tank 4 comprises a tank inlet 6 and a tank outlet 8. The pump arrangement 2 is designed to store and provide the saturated liquid from the tank 4 to a consumer 10. It may comprise a thermal insulation, which is not shown in detail herein. For example, the saturated liquid may be liquid hydrogen.

The liquid is tapped from the tank 4 through the outlet 8 and is provided to a liquid inlet 12 of a heat exchanger 14. Here, one or more cooling channels, which are not shown in detail, are provided, through which the liquid flows. The liquid is discharged at a liquid outlet 16. The heat exchanger 14 further comprises a coolant inlet 18 and a coolant outlet 20. A two-phase flow, i.e. the liquid and evaporated liquid explained further below, enters the coolant inlet 18. By flowing through the heat exchanger 14, it receives evaporation enthalpy, such that it preferably evaporates completely. Afterwards, it exits the coolant outlet 20 mainly in the form of gas. At the same time, the liquid that exits the liquid outlet 16 is sub-cooled.

The sub-cooled liquid enters a pump inlet 22 of a pump 24 and is then fed from a pump outlet 26 to a pump arrangement output 28 for feeding the consumer 10 with the saturated liquid. At a junction 30 downstream the pump 24 and upstream of the pump arrangement output 28, a fraction of the sub-cooled liquid is tapped and fed to an expansion valve 32 through an expansion valve inlet 34. Here, the liquid is expanded and partially evaporates to create the above two-phase flow. The two-phase flow exits an evaporation valve outlet 36 and enters the coolant inlet 18 directly downstream. The expansion valve 34 comprises a variable cross-section to enable the control of the fraction of liquid tapped at the junction 30.

Vaporized liquid, i.e. the gas flowing out from the coolant outlet 20, is fed to a compressor inlet 38 of a compressor 40. Here, the gas is pressurized and fed to the tank inlet 6 through the compressor outlet 42. Hence, the pressure inside the tank 4 this increased. By increasing the tank pressure as well as by sub-cooling the saturated liquid at the pump arrangement output 28, the NPSP is clearly improved. This configuration also allows to chill down and prime the pump 24 to its operational temperature through the compressor 40 and does not require a mass flow to chill down the pump 24 to be vented.

Figure 2:
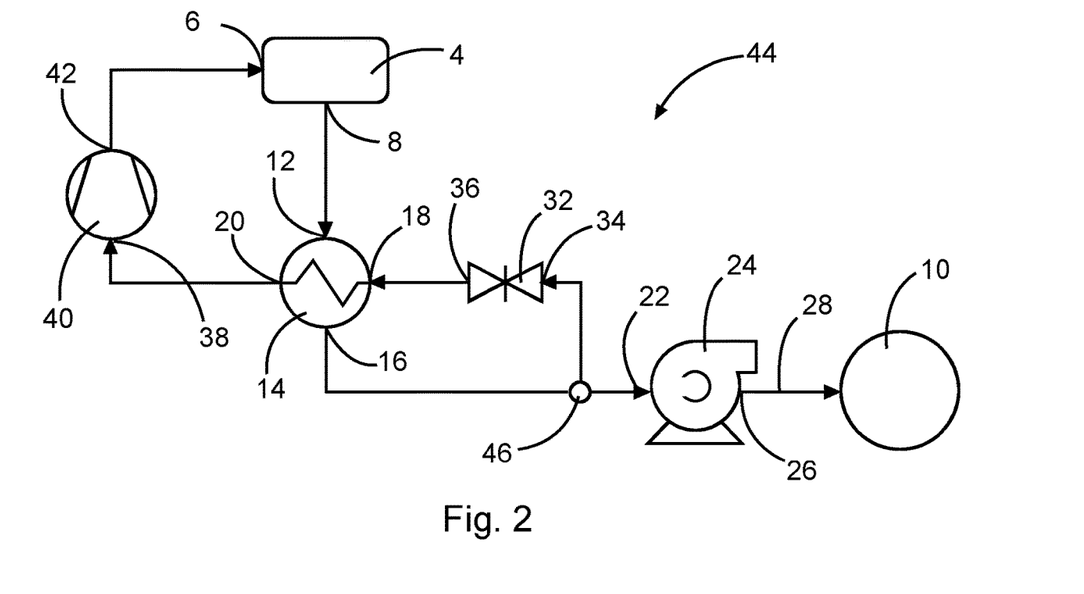

FIG. 2 shows a pump arrangement 44, which is based on the previously explained pump arrangement 2 and comprises a slight modification. Here, the expansion valve inlet 34 is connected to a junction 46, which is downstream of the liquid outlet 16 and upstream of pump inlet 22. Thus, the mass flow handled by the pump 24 and thus the required power for the pump 24 is slightly decreased. Furthermore, the pressure differential between the expansion valve inlet 34 and the expansion valve outlet 36 may be slightly smaller than in the pump arrangement 2 shown in FIG. 1. For increasing the tank pressure as much as in pump arrangement 2 of FIG. 1, the compressor 40 may need to provide a slightly higher compression.

Figure 3:
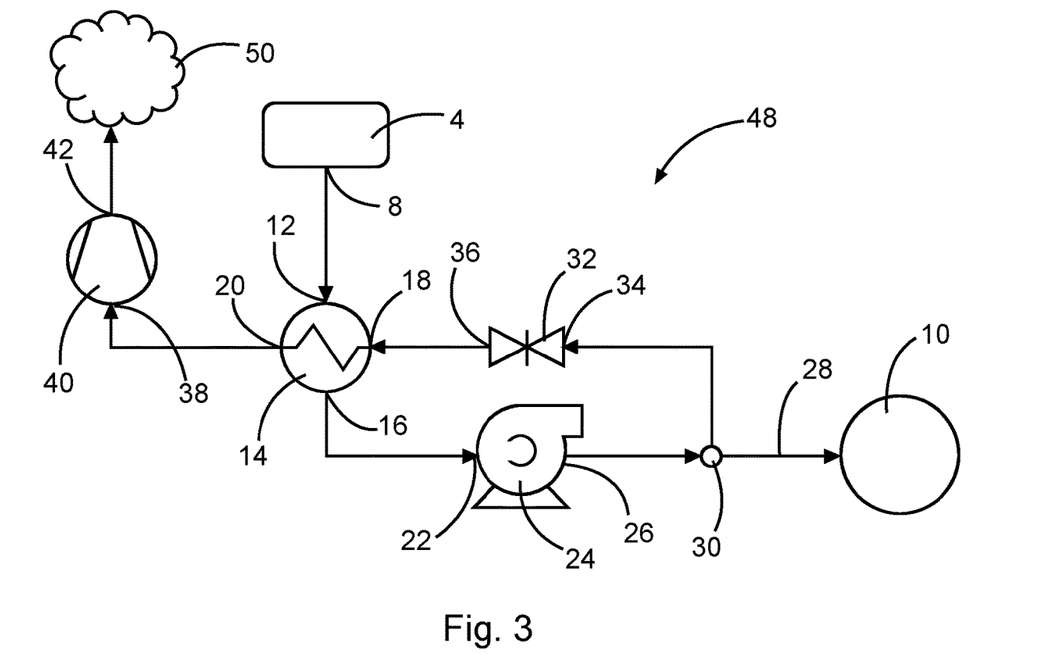

FIG. 3 shows a pump arrangement 48, which is another modification of the pump arrangement 2 shown in FIG. 1. Here, the compressor outlet 42 is not connected to the tank 4, but to the atmosphere 50. Hence, the compressor 40 is merely adapted for increasing the pressure of the vaporized liquid to a pressure that is slightly above the atmospheric pressure. This allows to vent the vaporized liquid into the atmosphere 50. This reduces the complexity of the pump arrangement 48 and may eliminate the need for controlling the compressor 40.

Figure 4:
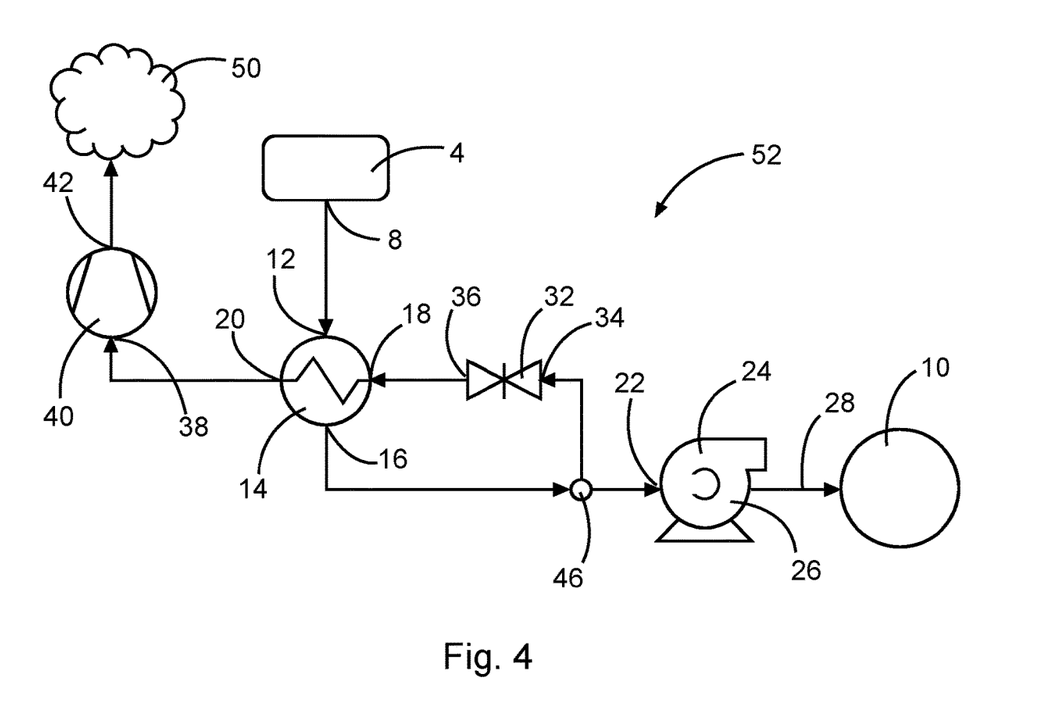

FIG. 4 shows a further pump arrangement 52, which includes the modifications of pump arrangement 48 of FIG. 3 and pump arrangement 44 of FIG. 2. Here, a fraction of the sub-cooled liquid is tapped from junction 46 upstream of the pump 24 and is fed to the expansion valve 32 through the expansion valve inlet 34. Furthermore, the compressor outlet 42 is connected to the atmosphere 50. Consequently the pump 24 may require slightly less power than with tapping the fraction of sub-cooled liquid from junction downstream the pump 24. The compressor 40 may not need to be controlled and may not require providing a compression ratio as high as in the embodiments of FIGS. 1 and 2 and its power consumption may thus be lower.

Figure 5:
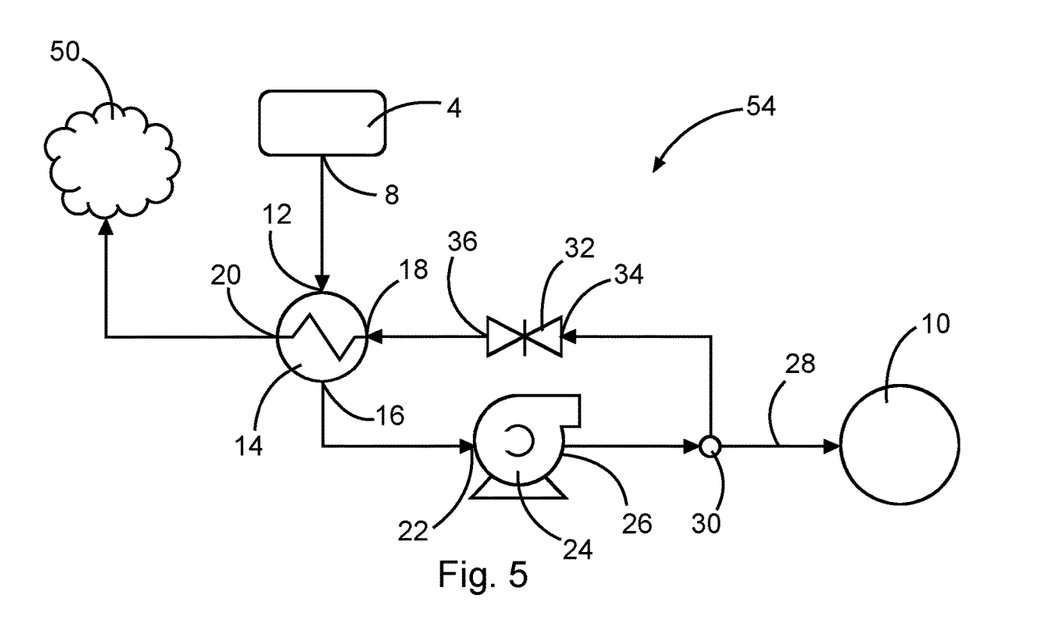

FIG. 5 shows a pump arrangement 54, which is based on the pump arrangement 48 shown in FIG. 3, but does not comprise a compressor 40. This variant may exemplarily be used in space applications or in applications where the pressure reached at the coolant outlet 20 is higher than the atmospheric pressure.

Figure 6:
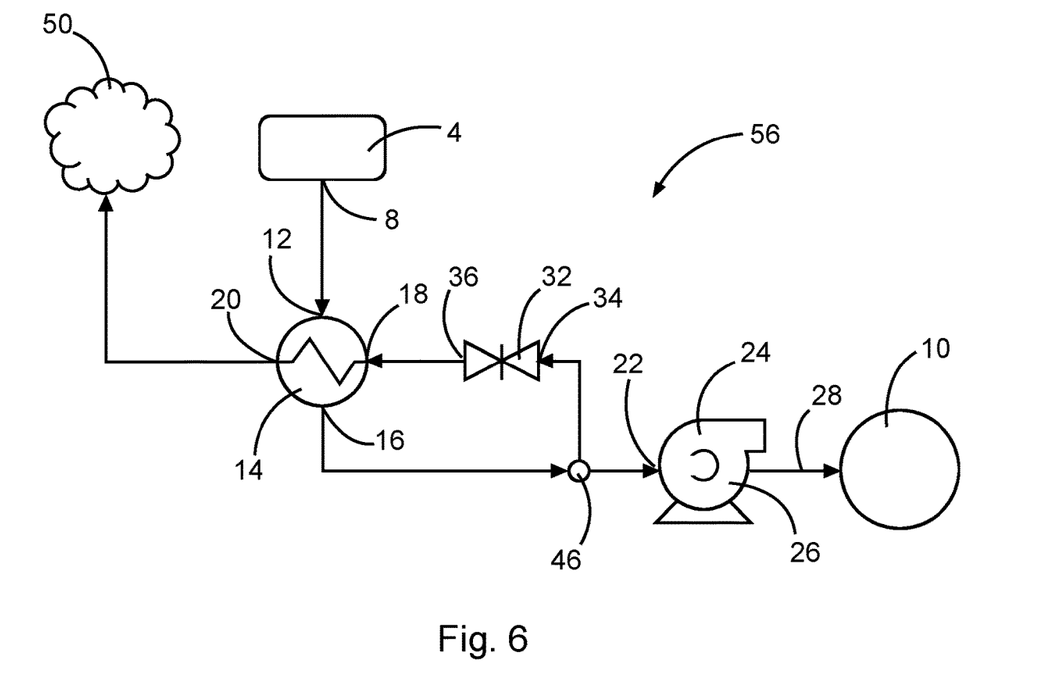

FIG. 6 shows a further pump arrangement 56, which is based on the pump arrangement 54 shown in FIG. 5. However, the extension valve 32 is supplied with a fraction of sub-cooled liquid from junction 46 upstream of the pump 24, as shown in FIGS. 2 and 4.

Figure 7:
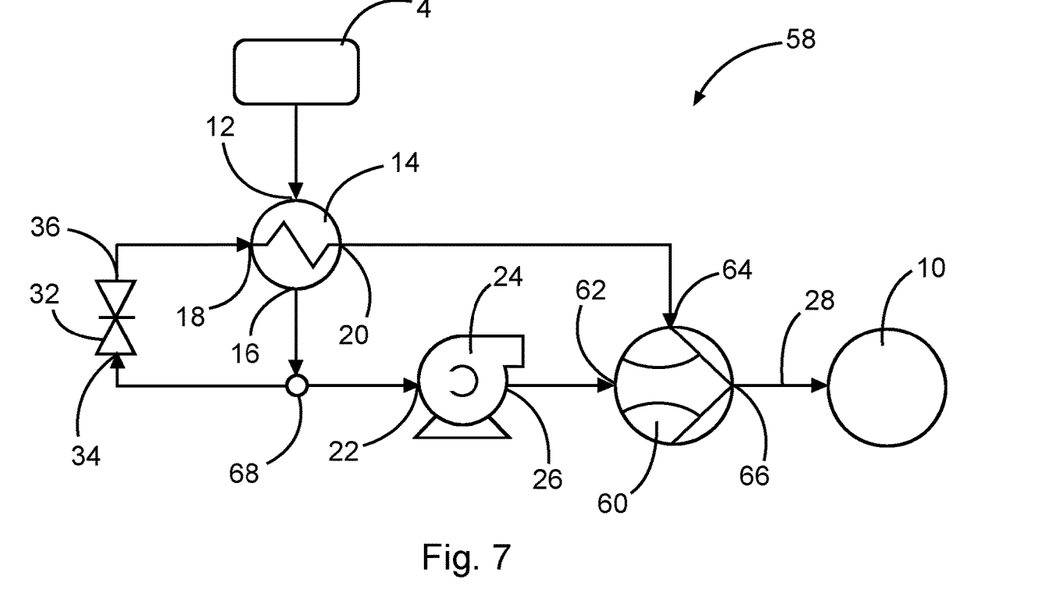

FIG. 7 shows a pump arrangement 58, which comprises a jet pump 60 having a primary inlet 62 and a secondary inlet 64. Sub-cooled liquid exiting the pump outlet 26 is fed to the primary inlet 62 of the jet pump 60. Evaporated liquid, i.e. the gas exiting the coolant outlet 20, is fed to the secondary inlet 64 of the jet pump 60. Due to the flow of the sub-cooled liquid into the primary inlet 62, the gas is suctioned into the secondary inlet 64 and is mixed with the primary flow. The resulting combination flow out through a jet pump outlet 66. The pump arrangement output 28 in this embodiment is located downstream of the jet pump outlet 66 and feeds the liquid to the consumer 10. The use of a jet pump 60 is beneficial, as it is a passive device capable of increasing the pressure of the already expanded and evaporated liquid from the coolant outlet 22 to feed it to the consumer 10.

The heat exchanger 14 is connected to the tank 4 through the liquid inlet 12 and the sub-cooled liquid flows out through the liquid outlet 16. Here, a junction 68 is provided, from which a main flow of sub-cooled liquid is fed to the pump inlet 22. A fraction of the flow is fed to the expansion valve inlet 34 to be expanded in the expansion valve 32. Afterwards, it is fed to the coolant inlet 18 through the expansion valve outlet 36.

Figure 8:
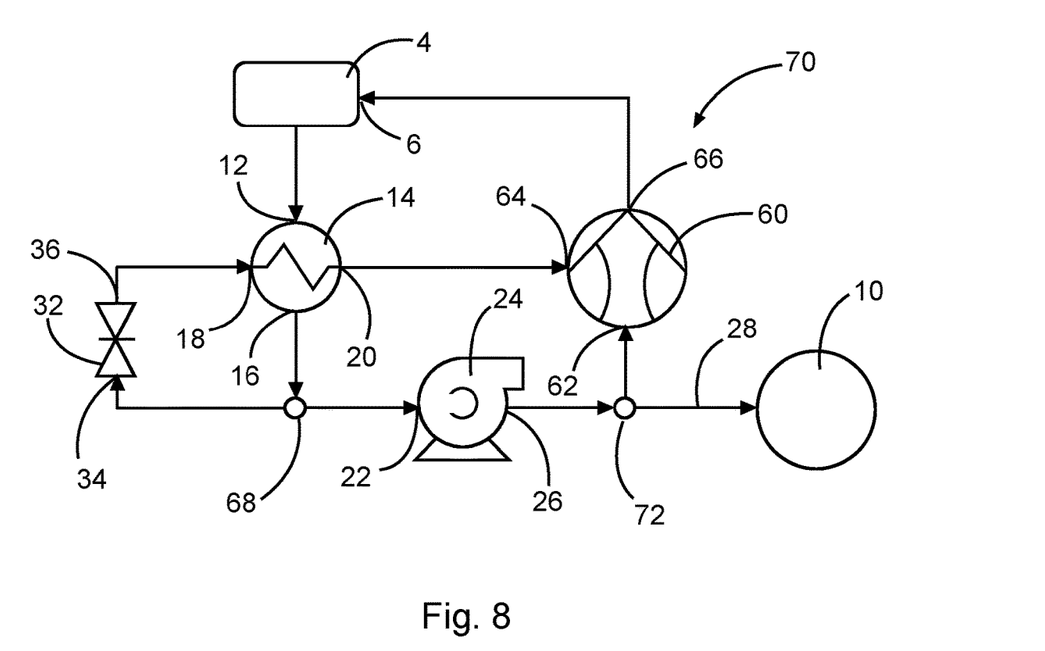

FIG. 8 shows a pump arrangement 70, which is based on the pump arrangement 58 shown in FIG. 7. However, in this exemplary embodiment, the pump arrangement output 28 is connected to a junction 72, which is located downstream the pump outlet 26 and upstream of the primary inlet 62 of the jet pump 60. Thus, only a fraction of the sub-cooled liquid flowing out from the pump outlet 26 is fed to the primary inlet 62 of the jet pump 60.

Here, the evaporated liquid, i.e. the gas exiting the coolant outlet 20, is fed to the secondary inlet 64 and is suctioned through the action of the primary jet pump flow into the secondary inlet 64. The jet pump outlet 66 in turn is coupled with the tank inlet 6 in order to feed a part of the saturated liquid as well as the evaporated liquid back into the tank 4 for increasing the pressure inside the tank 4.

Figure 9:
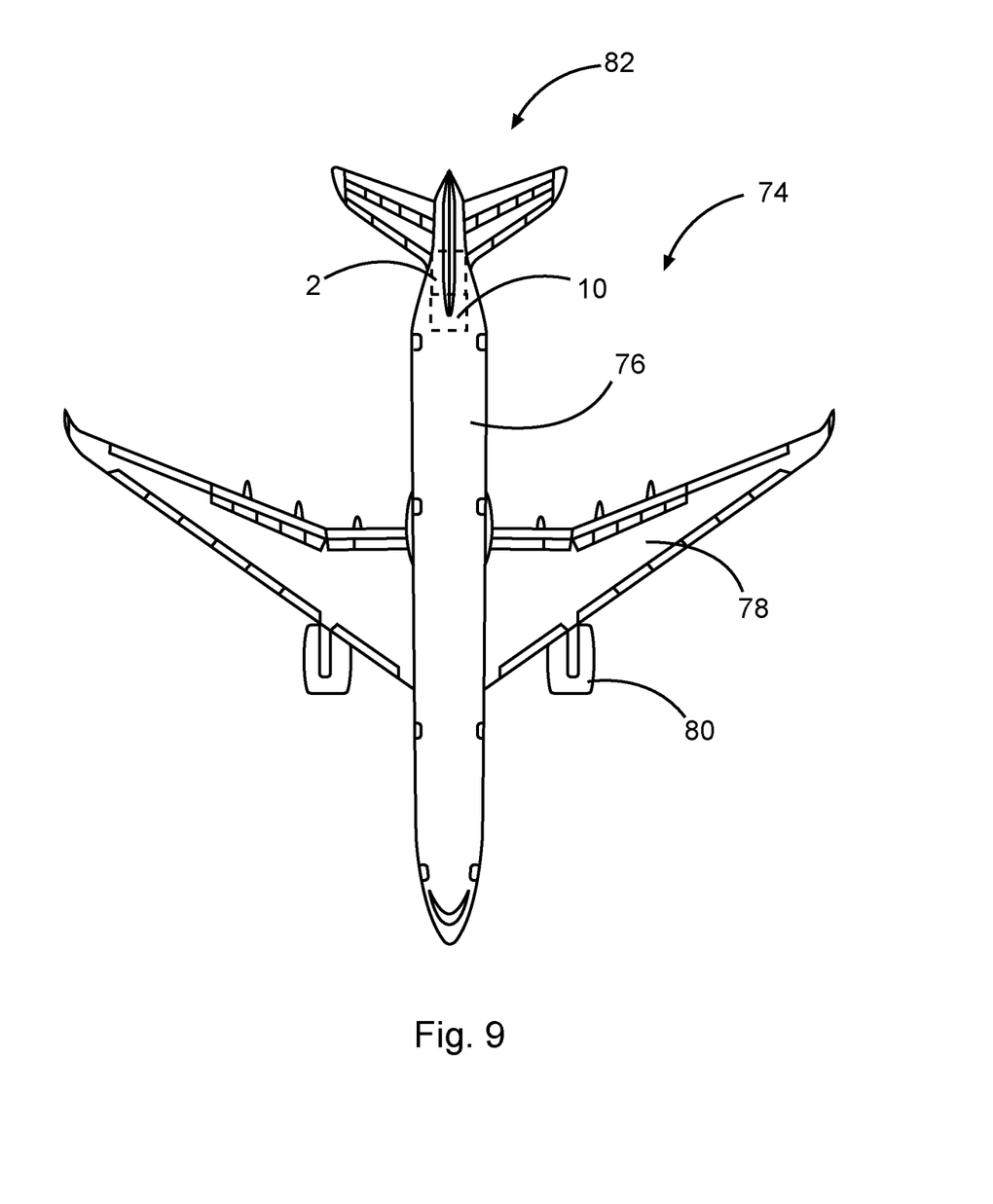
FIG. 9 shows an aircraft having a consumer and such a pump arrangement.

Lastly FIG. 9 shows an aircraft 74, which comprises a fuselage 76, wings 78, engines 80 and a tail plane 82. Exemplarily a consumer 10, which may be a fuel cell system, is integrated in the region of the tail plain 82 and is indicated by a dashed box. A pump arrangement 2, or any other of the above-explained pump arrangements 44, 48, 52, 54, 56, 58 or 70 may be placed in the direct vicinity thereof. It may be capable of providing hydrogen to the consumer 10. However, other types of consumers, other liquids, or other aircraft configurations and other vehicles are not ruled out and this illustration is merely an example.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 pump arrangement
4 tank
6 tank inlet
8 tank outlet
10 consumer
12 liquid inlet
14 heat exchanger
16 liquid outlet
18 coolant inlet
20 coolant outlet
22 pump inlet
24 pump
26 pump outlet
28 pump arrangement output
30 junction
32 expansion valve
34 expansion valve inlet
36 expansion valve outlet
38 compressor inlet
40 compressor
42 compressor outlet
44 pump arrangement
46 junction
48 pump arrangement
50 atmosphere
52 pump arrangement
54 pump arrangement
56 pump arrangement
58 pump arrangement
60 jet pump
62 primary inlet
64 secondary inlet
66 jet pump outlet
68 junction
70 pump arrangement
72 junction
74 aircraft
76 fuselage
78 wing
80 engine
82 tail plane

The invention claimed is:

1. A pump arrangement for providing a saturated or subcooled liquid, comprising:
   a tank for saturated liquid having a tank outlet;
   a heat exchanger for cooling the saturated liquid, the heat exchanger having a liquid inlet, a liquid outlet, a coolant inlet and a coolant outlet;
   a pump having a pump inlet and a pump outlet;
   an expansion valve having an expansion valve inlet and an expansion valve outlet; and
   a pump arrangement output downstream the pump outlet for feeding saturated or subcooled liquid to a consumer,
   wherein the tank outlet is in fluid communication with the liquid inlet of the heat exchanger, such that saturated liquid stored inside the tank is able to flow into the heat exchanger,
   wherein the heat exchanger is configured to sub-cool the saturated liquid,
   wherein the liquid outlet of the heat exchanger is in fluid communication with the pump inlet,
   wherein the expansion valve outlet is in fluid communication with the coolant inlet of the heat exchanger, and
   wherein the expansion valve inlet is arranged downstream the liquid outlet of the heat exchanger or the tank for receiving and expanding a fraction of liquid flowing through the pump arrangement and routing the liquid into the coolant inlet to evaporate at reduced saturation temperature at least partially and receive evaporation enthalpy of the liquid to be sub-cooled.

2. The pump arrangement according to claim 1, further comprising a compressor coupled with the coolant outlet.

3. The pump arrangement according to claim 1, wherein the expansion valve is connected to a fluid line downstream the pump and upstream the coolant inlet.

4. The pump arrangement according to claim 1, wherein the expansion valve is connected to a fluid line upstream the pump and upstream the coolant inlet.

5. The pump arrangement according to claim 2, wherein the compressor is connected to a tank inlet.

6. The pump arrangement according to claim 2, wherein the compressor or coolant outlet is in fluid communication with the environment.

7. The pump arrangement according to claim 1, wherein the pump arrangement further comprises a jet pump having a primary inlet, a secondary inlet and a jet pump outlet,
wherein the expansion valve is arranged downstream of the liquid outlet of the heat exchanger,
wherein the pump is coupled with the primary inlet, and
wherein the coolant outlet is coupled with the secondary inlet.

8. The pump arrangement according to claim 7, wherein the jet pump outlet is coupled with a tank inlet.

9. The pump arrangement according to claim 8, wherein the pump arrangement output is downstream the pump and upstream the primary inlet of the jet pump.

10. The pump arrangement according to claim 7, wherein the pump arrangement output is connected to the jet pump outlet.

11. The pump arrangement according to claim 1, wherein the expansion valve has a variable cross-section for controlling the fraction of saturated liquid flowing through the expansion valve.

12. A method for providing a saturated or subcooled liquid, comprising:
feeding the saturated or subcooled liquid from a tank through a tank outlet to a liquid inlet of a heat exchanger to sub-cool the liquid;
feeding a fraction of the sub-cooled liquid or the saturated or subcooled liquid from the tank to an expansion valve inlet of an expansion valve to evaporate the liquid at reduced saturation temperature relative to the saturation temperature in the tank at least partially, and feed the liquid to a coolant inlet of the heat exchanger for receiving evaporation enthalpy from the liquid flowing into the liquid inlet to substantially evaporate completely feeding the sub-cooled liquid from a liquid outlet of the heat exchanger to a pump inlet of a pump; and
pumping the sub-cooled liquid to a pump arrangement output downstream the pump outlet for feeding saturated liquid to a consumer.

13. The method according to claim 12, further comprising:
feeding the evaporated liquid into a tank inlet of the tank for increasing the pressure inside the tank.

14. A vehicle, comprising at least one pump arrangement according to claim 1, and at least one consumer coupled with the pump arrangement output of the at least one pump arrangement.

15. The vehicle according to claim 14, wherein the vehicle is an aircraft and wherein the at least one consumer comprises a fuel cell and/or a device for conducting a combustion.

* * * * *